March 16, 1948. E. J. CASPER 2,437,907
CASTER
Filed June 12, 1946
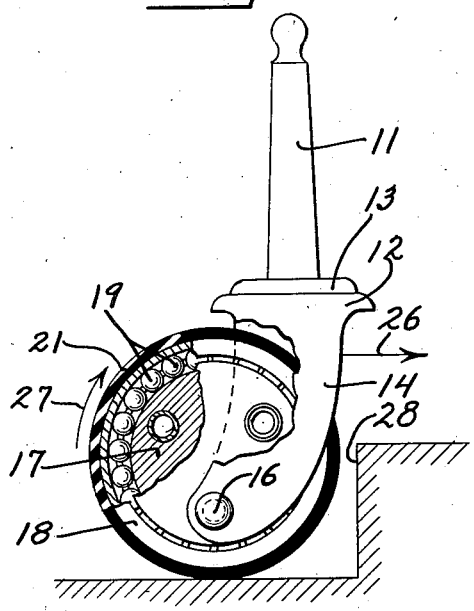
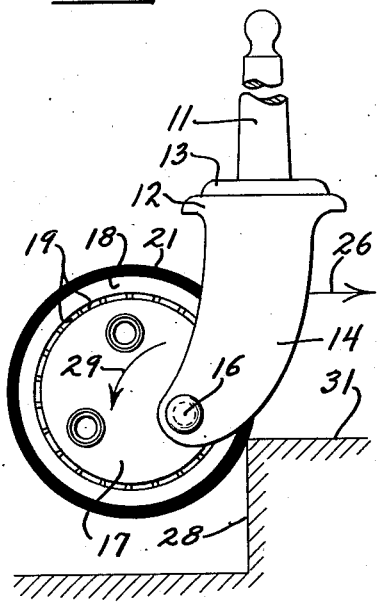
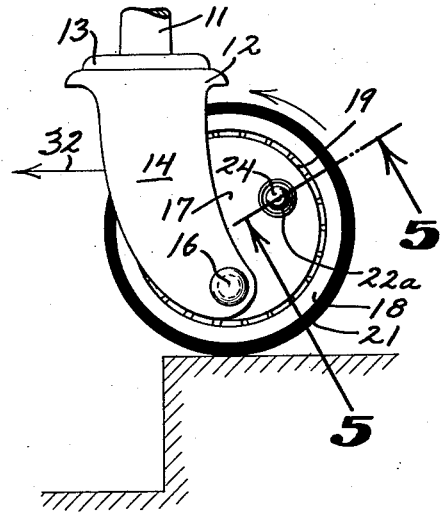
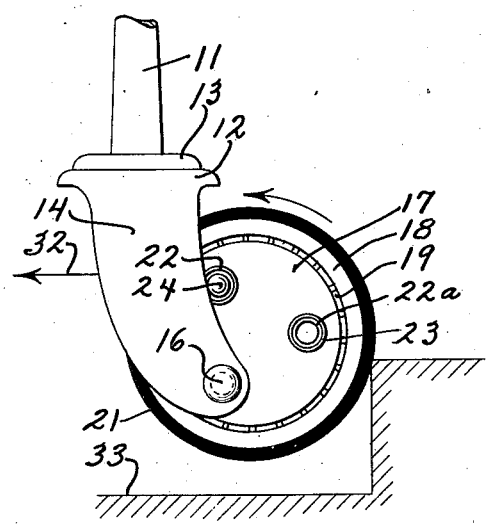
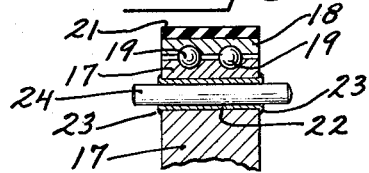
INVENTOR,
ERVIN J. CASPER.
BY
Stephen S. Townsend
ATTORNEY.

Patented Mar. 16, 1948

2,437,907

UNITED STATES PATENT OFFICE 2,437,907

CASTER

Ervin J. Casper, Vallejo, Calif., assignor of one-half to Kenneth K. Casper, Vallejo, and one-half to William Henry Wilson, San Francisco, Calif.

Application June 12, 1946, Serial No. 676,213

7 Claims. (Cl. 16—46)

This invention relates to casters or wheels which are for use on wheel-chairs, hospital beds and guerneys, baby carriages, hand and self-propelled trucks, and the like, for moving material.

It is often desirable that the load, whether animate or inanimate, should not be subjected to any great shock or bump during transport, and an object of this invention is to lessen the shock ordinarily due to the conveyance moving to an abruptly different level. Another object of this invention is to lessen the shock ordinarily due to passing over irregularities in the floor surface.

Other objects and advantages of this invention will become apparent on reading this specification.

Referring to the accompanying drawings:

Fig. 1 is a side elevation, partially broken away, of my improved caster in its normal position on a level floor.

Fig. 2 is a similar view with the caster riding up a step or other obstruction.

Fig. 3 is a similar view with the caster on a level floor and prepared to ride down off of a step or obstruction.

Fig. 4 is a similar view, showing the caster riding down.

Fig. 5 is a cross section on the line 5—5 of Fig. 3.

My improved caster includes a pintle 11 for insertion into a socket in any device which is to be supported by and to roll on the caster. This pintle is loosely riveted or otherwise attached to a forked yoke 12, so that it will not separate therefrom but can rotate freely or swivel with respect thereto, and a non-friction or ball bearing may be located within a cap 13 on the pintle. The yoke has a pair of parallel legs 14 which maintain in position a pin or shaft 16. The parts so far described may be of well known or other suitable construction.

An inner wheel-like member 17 is eccentrically mounted for rotation on the pin 16 between the legs 14. An annulus 18 is mounted to rotate about the periphery of the member 17 with an antifriction or ball bearing 19 between them. The periphery of the annulus 18 has a covering 21 of rubber or other resilient material to serve as a tire. The member 17 has transverse eccentric openings extending from side to side thereof. Preferably within the openings are tubes 22 and 22ª, the ends 23 of which are expanded to hold the tubes in place. Pins 24 are provided for insertion in the transverse openings through the members 17 and to project outwardly at both sides thereof.

The operation of the invention is as follows:

With the vehicle moving in any direction, casters suitably attached to it will swing to assume positions in the direction of such movement if they are not already in such position, due to the shape of the legs 14 and the swiveling of the yoke 12 to the pintle 11. With a caster moving in the path of the vehicle over a smooth horizontal surface in the direction indicated by the arrows 26 in Figs. 1 and 2, the relative positions the parts assume are shown in Fig. 1. The annulus or ring 18 rotates, in the direction of the arrow 27, around the member 17 which does not rotate, and the pin or shaft 16 is at its lowermost point and remains there, as long as the path is horizontal and smooth.

When the caster meets a step or other obstruction 28, the member 17 rotates through a limited movement in the direction of the arrow 29 in Fig. 2, that is, in a direction opposite to the direction of rotation of the ring 18 and the tire thereon. The pin or shaft 16 rises so that the caster automatically increases its height when the vehicle is elevated. A decrease in the height of the caster results as it approaches the level 31, by rotation of the member 17 in a direction which is the same as the direction of rotation of the tire until the pin or shaft 16 is again at its lowermost position.

When the caster rides off of a step or other obstruction in the direction of the arrows 32, as seen in Figs. 3 and 4, there is a normal tendency for the wheel member 17 to rotate very fast in the direction of rotation of the tire, which permits the vehicle to descend fast and stop with a bump when the level 33 is reached, the caster again automatically first increasing and then decreasing its height in so doing. By variably positioning the transverse openings through the member 17 and inserting a pin in one so that its ends project outwardly into the planes of the legs 14, I can reduce the bump to a minimum or to varying degrees, depending on the position of the pin 24 with respect to the legs 14. I thus convert a caster, which automatically lengthens and then shortens itself, into one wherein such lengthening and shortening is controllably reduced or avoided altogether.

Fig. 3 shows the pin in the opening 22ª, which permits a lengthening and later shortening of the caster to a degree less than normal and controlled by the angular distance between the pin and the legs. With the pin in the opening 22, as seen in Fig. 4, the pin is normally against the legs and the caster can not change its length by movement in the direction of the arrows 32.

Certain details have been illustrated and described for the purpose of explaining my invention, but it is to be understood that some of them can be varied without departing from the spirit of the invention, the scope of which is defined in the appended claims.

I claim:

1. A caster comprising a frame, a wheel eccentrically and revolubly carried by said frame, an annulus revolubly mounted around said wheel, whereby the height of the caster is automatically self-adjustable, and means to vary selectively such self-adjustability.

2. A caster comprising a frame, a wheel eccentrically and revolubly carried by said frame, an annulus revolubly mounted around said wheel whereby the height of the caster is automatically self-adjustable, and means to decrease selectively such self-adjustability.

3. A caster comprising a frame, a wheel eccentrically and revolubly carried by said frame, an annulus revolubly mounted around said wheel whereby the height of the caster is automatically self-adjustable, and means to avoid selectively such self-adjustability.

4. A caster comprising a frame, a wheel eccentrically and revolubly carried by said frame, an annulus revolubly mounted around said wheel whereby the height of the caster is automatically self-adjustable, and means removably carried by said wheel to control such self-adjustability.

5. A caster comprising a frame, a wheel eccentrically and revolubly carried by said frame, an annulus revolubly mounted around said wheel, said wheel having an eccentric transverse opening, and a pin to be inserted into said opening and to project therefrom into the plane of a part of said frame.

6. A caster comprising legs, a wheel between said legs and eccentrically and revolubly carried thereby, an annulus revolubly mounted around said wheel, said wheel having an eccentric transverse opening therethrough, and a pin to be inserted into said opening and to project therefrom into the planes of said legs.

7. A caster comprising legs, a wheel between said legs and eccentrically and revolubly carried thereby, an annulus revolubly mounted around said wheel, said wheel having eccentric transverse openings therethrough, and a pin to be inserted into a selected opening and to project therefrom into the planes of said legs.

ERVIN J. CASPER.

REFERENCES CITED

The following references are of record in the file of this patent:

UNITED STATES PATENTS

| Number | Name | Date |
|---|---|---|
| Re. 20,884 | Herold | Oct. 18, 1938 |
| 870,791 | Mosman | Nov. 12, 1907 |
| 1,368,465 | Sutliffe | Feb. 15, 1921 |
| 1,452,135 | Adams | Apr. 17, 1923 |
| 1,571,334 | Howard | Feb. 2, 1926 |
| 2,386,005 | Raup | Oct. 2, 1945 |